(12) United States Patent
Fukui

(10) Patent No.: US 9,371,030 B2
(45) Date of Patent: Jun. 21, 2016

(54) POWER SUPPLY, HEAD LIGHT DEVICE USING THE POWER SUPPLY, AND VEHICLE USING THE HEADLIGHT DEVICE

(71) Applicant: Panasonic Intellectual Property Management Co., Ltd., Osaka (JP)

(72) Inventor: Takahiro Fukui, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/707,359

(22) Filed: May 8, 2015

(65) Prior Publication Data

US 2015/0353001 A1 Dec. 10, 2015

(30) Foreign Application Priority Data

Jun. 5, 2014 (JP) .................................. 2014-117068

(51) Int. Cl.
  *B60Q 1/04* (2006.01)
  *H05B 33/08* (2006.01)
  *H02M 1/00* (2006.01)
  *H02M 3/335* (2006.01)

(52) U.S. Cl.
  CPC ............. *B60Q 1/04* (2013.01); *H02M 3/33507* (2013.01); *H05B 33/0809* (2013.01); *H05B 33/0845* (2013.01); *H02M 2001/0022* (2013.01)

(58) Field of Classification Search
  CPC ............. H02M 3/33507; H02M 1/32; H02M 3/33523; H02M 2001/0032; H02M 2001/0096; H02M 3/335; H05B 39/048
  USPC ............. 315/82–84, 360, 291, 283, 223, 225; 323/280–285; 363/21.01, 21.1–21.18, 363/89; 327/74, 541, 73, 63–65, 206
  See application file for complete search history.

(56) References Cited

U.S. PATENT DOCUMENTS

| 7,242,150 B2 * | 7/2007 | DeJonge ............... H05B 39/048 315/225 |
| 9,054,581 B2 * | 6/2015 | Langeslag ........... H02M 3/1563 |
| 2008/0061841 A1 * | 3/2008 | Ohira ................ G01R 19/16542 327/74 |
| 2009/0103338 A1 * | 4/2009 | Nakamura ........ H02M 3/33507 363/89 |
| 2009/0153123 A1 * | 6/2009 | Kraft ....................... H02M 1/32 323/285 |
| 2013/0088172 A1 | 4/2013 | Kikuchi et al. |

FOREIGN PATENT DOCUMENTS

| EP | 2571333 A1 | 3/2013 |
| JP | 2009-100591 | 5/2009 |

(Continued)

*Primary Examiner* — Alexander H Taningco
*Assistant Examiner* — Renan Luque
(74) *Attorney, Agent, or Firm* — Renner, Otto, Boisselle & Sklar, LLP

(57) ABSTRACT

A control circuit is configured to compare an input voltage measured through an input voltage detection circuit with a first threshold which is lower than a rated voltage of an external DC power supply and with a second threshold which is lower than the first threshold. The control circuit is configured, when detecting that a duration time in which the input voltage is kept lower than the first threshold reaches a predetermined holding period, to stop operating a switching device. The control circuit is configured, after detecting that the input voltage is lower than the second threshold, to more shorten a maximum ON time than that during a normal operation or lengthen an OFF time of the switching device than a maximum OFF time during the normal operation.

20 Claims, 10 Drawing Sheets

(56) References Cited

FOREIGN PATENT DOCUMENTS

| JP | 2010-146966 | 7/2010 |
| JP | 2011-113642 | 6/2011 |
| JP | 2013-62160 | 4/2013 |
| JP | 2013-84370 | 5/2013 |

* cited by examiner

US 9,371,030 B2

POWER SUPPLY, HEAD LIGHT DEVICE USING THE POWER SUPPLY, AND VEHICLE USING THE HEADLIGHT DEVICE

CROSS-REFERENCE TO RELATED APPLICATIONS

The application is based upon and claims the benefit of priority of Japanese Patent Application No. 2014-117068, filed on Jul. 5, 2014, the entire contents of which are incorporated herein by reference.

TECHNICAL FIELD

The invention relates to a power supply, a headlight device using the power supply, and a vehicle using the headlight device.

BACKGROUND ART

There has been proposed a power supply that includes a DC-DC converter configured to be controlled so as to output a constant current. This power supply is used, for example, for lighting light-emitting diodes in a headlight device (see for example, JP2011-113642A). In a case where the power supply is used in a headlight device of a vehicle, an in-vehicle battery is used as a power source of the DC-DC converter.

It is notable that, in a case where the DC-DC converter is supplied energy from the in-vehicle battery and the in-vehicle battery is also connected to another load (such as a starter), the supplied voltage (input voltage to the DC-DC converter) may temporarily decrease when this another load is operated (for example, when an engine of the vehicle is activated).

The DC-DC converter is therefore operated so as to increase an output current thereof during a period in which the supplied voltage is decreased, so that the reduction of the output current of the DC-DC converter caused by the decrease of the supplied voltage can be compensated. In detail, for example, the ON duty ratio of a switching device of the DC-DC converter, which may be a boost converter (boost chopper) or a flyback converter, is increased during the period in which the supplied voltage is decreased.

However, when the input voltage to the DC-DC converter temporarily decreases and then returns to an original voltage, the output current of the DC-DC converter to a load possibly increases excessively due to the delay of the control in the DC-DC converter.

SUMMARY

The present invention is achieved in view of the above circumstances, and an object thereof is to provide a power supply capable of suppressing an occurrence of excessive increase in the output current, a headlight device using the power supply, and a vehicle using the headlight device.

A power supply according to one aspect of the invention includes a DC-DC converter and a control circuit. The DC-DC converter includes a switching device, an inductor and a capacitor. Energy is accumulated in the inductor by an electric power from an external DC power supply when the switching device is turned on. The capacitor is configured to be charged by a regeneration current from the inductor when the switching device is turned off. The control circuit is configured to control switching operation of the switching device within ranges of a maximum ON time and a maximum OFF time. The control circuit includes an input voltage detection circuit configured to measure an input voltage from the DC power supply to the DC-DC converter. The control circuit is configured: to compare the input voltage measured through the input voltage detection circuit with a first threshold which is lower than a rated voltage of the DC power supply and with a second threshold which is lower than the first threshold; when detecting that a duration time in which the input voltage is lower than the first threshold reaches a predetermined holding period, to stop operating the switching device; and after detecting that the input voltage is lower than the second threshold, to more shorten the maximum ON time than that during a normal operation or lengthen an OFF time of the switching device than the maximum OFF time during the normal operation.

A headlight device according to one aspect of the invention includes the power supply described above and a light source configured to be lit by an output power from the power supply.

A vehicle according to one aspect of the invention includes the headlight device described above and a vehicle on which the headlight device is mounted.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION

A power supply 1 of an embodiment will be described below with reference to attached drawings.

Figure 1:
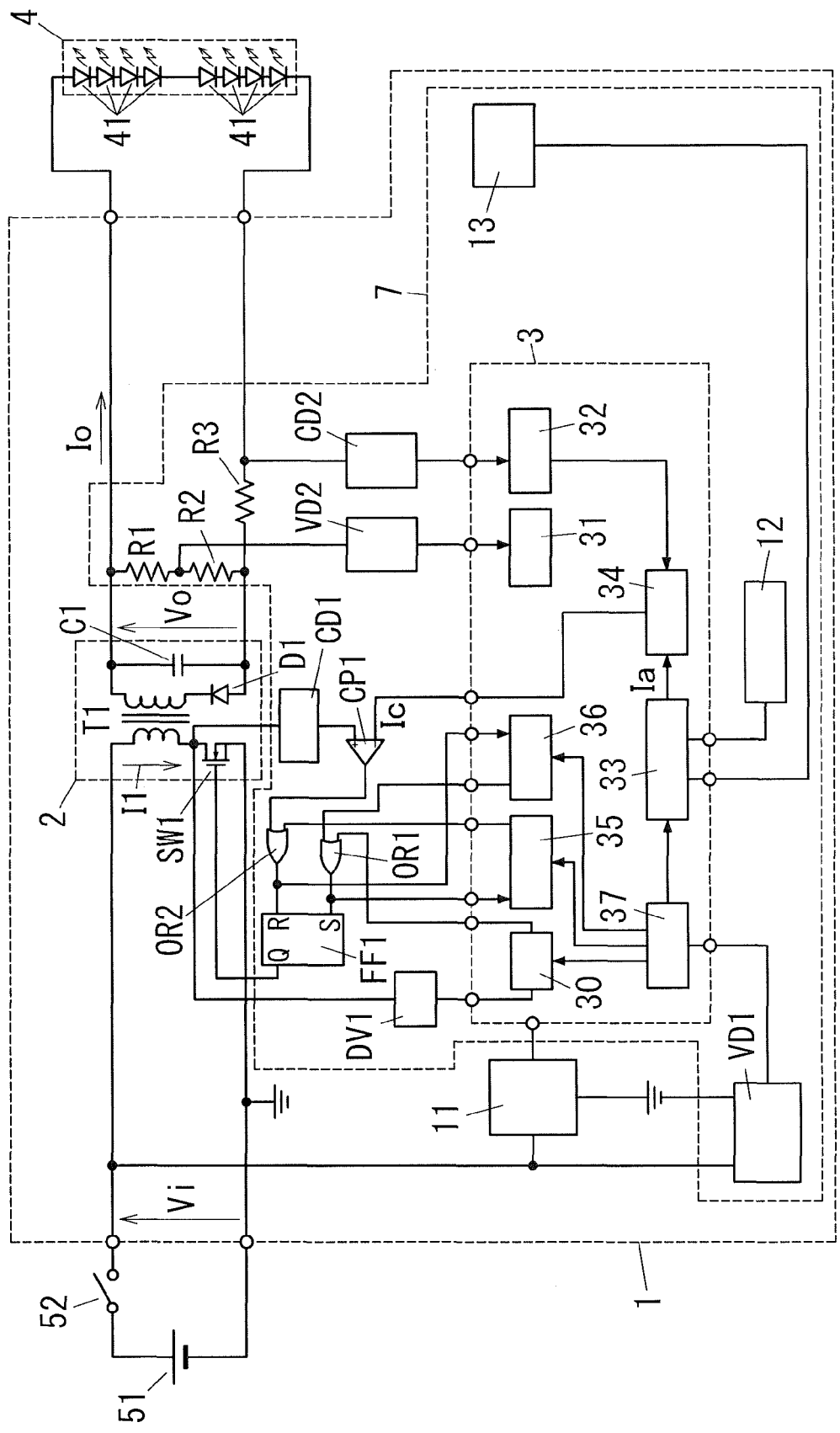
FIG. 1 is a circuit diagram of a power supply according to an example of an embodiment.

As shown in FIG. 1, the power supply 1 of the embodiment includes a DC-DC converter 2 and a control circuit 7. The DC-DC converter 2 is configured to convert an input power from an external DC power supply 51 into a DC power and to output the resultant DC power. The control circuit 7 is configured to control an operation of the DC-DC converter 2. The output (power) of the DC-DC converter 2 is to be used for lighting a light source 4 which, for example, includes a series circuit of multiple light-emitting diodes 41.

The DC power supply 51 is, for example, an in-vehicle battery. As shown in FIG. 1, a switch 52 is disposed between the DC power supply 51 and the power supply 1 in order to switch supplying electric power from the DC power supply 51 to the power supply 1.

The DC-DC converter 2 of the embodiment includes a flyback converter. The DC-DC converter 2 includes two input terminals, a transformer T1 (as an inductor), a switching device SW1, a diode D1, a capacitor C1, and two output terminals. A series circuit of a primary winding of the transformer T1 and the switching device SW1 is connected across the input terminals. The DC power supply 51 is to be connected across the input terminals. A series circuit of the diode D1 and the capacitor C1 is connected across a secondary winding of the transformer T1. In detail, an anode of the diode D1 is connected to the capacitor C1, and a cathode of the diode D1 is connected to the secondary winding of the transformer T1. The capacitor C1 is connected across the output terminals. Hence, the voltage across the capacitor C1 corresponds to an output voltage of the DC-DC converter 2. Also, the diode D1 is connected in a direction of a charge current from the secondary winding of the transformer T1 flowing to the capacitor C1 during a period in which a current input from the DC power supply 51 to the primary winding of the transformer T1 decreases. The switching device SW1 includes, for example, an N-channel MOSFET.

Specifically, during a period in which the switching device SW1 is turned on, energy is accumulated in the transformer T1 and the current flowing though the transformer T1 gradually increases. During a period in which the switching device SW1 is turned off, the accumulated energy is discharged from the secondary winding of the transformer T1, and thus the capacitor C1 is charged by a current (regeneration current) flowing through the diode D1 and the voltage across the primary winding of the transformer T1 gradually decreases.

As shown in FIG. 1, the control circuit 7 includes a switching control circuit (integrated circuit) 3 for controlling timings of turning On and Off of the switching device SW1. The power supply 1 further includes a control power supply circuit 11. The control power supply circuit 11 is configured to convert an input DC power from the DC power supply 51 to generate a DC power for operating the switching control circuit 3. The control power supply circuit 11 includes, for example, a three-terminal regulator and a capacitor.

The control circuit 7 is configured to control switching operation of the switching device SW1 of the DC-DC converter 2 within ranges of a maximum ON time Ton-max and a maximum OFF time Toff-max (described in detail later).

As shown in FIG. 1, the control circuit 7 further includes an RS (set-reset type) flip flop circuit FF1 having a Q-terminal (output terminal) connected to a gate terminal of the switching device SW1. Hence, the switching device SW1 is driven according to an output signal of the flip flop circuit FF1.

The control circuit 7 further includes a differentiator DV1, an OR gate (first OR gate) OR1, a primary current detection circuit CD1, a comparator CP1 and another OR gate (second OR gate) OR2. The switching control circuit 3 includes a timing controller 30.

The differentiator DV1 is configured to generate a voltage signal substantially proportional to a change in a drain-source voltage of the switching device SW1, and to output the generated voltage signal. Note that, the drain-source voltage of the switching device SW1 substantially corresponds to a total voltage of the voltage of the DC power supply 51 and the voltage across the primary winding of the transformer T1. The output of the differentiator DV1 is supplied to an S-terminal (set terminal) of the flip flop circuit FF1, through the timing controller 30 and the first OR gate OR1. The timing controller 30 is configured to output a pulse signal to the S-terminal of the flip flop circuit FF1 through the first OR gate OR1, upon the elapse of a delay time from a time point when an output pulse signal is supplied from the differentiator DV1. The delay time is normally set to 0.

The primary current detection circuit CD1 is configured to measure a current (hereinafter, referred to as "primary current") flowing through the switching device SW1. The comparator CP1 is configured to compare the primary current I1 measured by the primary current detection circuit CD1 with a primary current instruction value (threshold) Ic supplied from the switching control circuit 3. The output of the comparator CP1 is input to an R-terminal (reset terminal) of the flip flop circuit FF1, through the second OR gate OR2.

Figure 2:
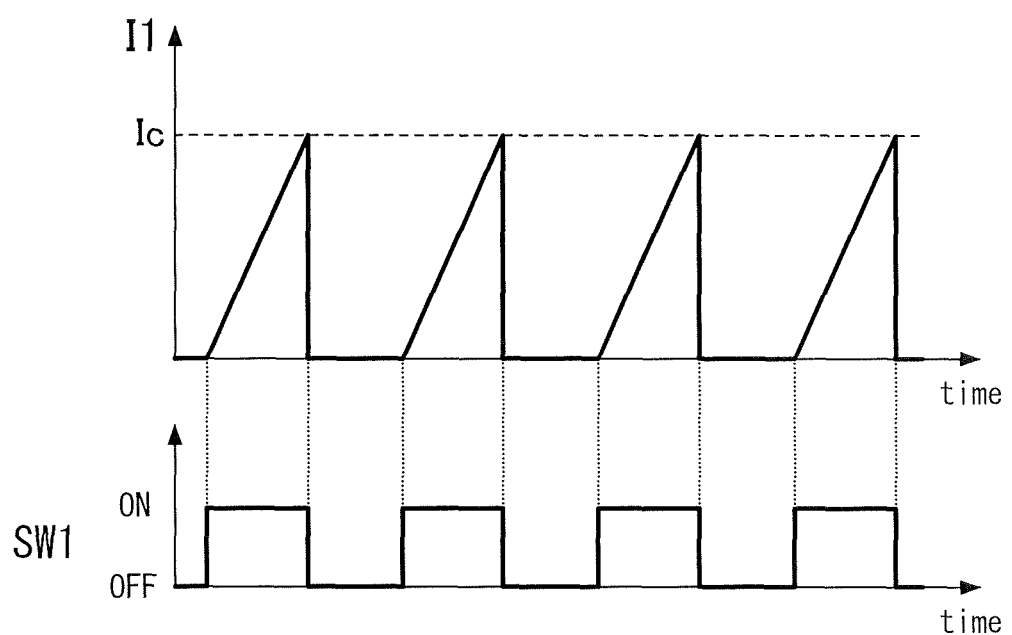
FIG. 2 is a diagram illustrating a relation between a primary current and an on-off state of a switching device in a DC-DC converter of the power supply.

Hence, as shown in FIG. 2, during a period (hereinafter, referred to as "ON period") in which the switching device SW1 is turned on, the primary current I1 gradually increase. When the primary current I1 reaches the primary current instruction value Ic, the output of the comparator CP1 is switched to an H-level, and thus a pulse signal is supplied to the R-terminal of the flip flop circuit FF1. Upon the pulse signal is supplied to the R-terminal, the flip flop circuit FF1 shifts the level of the output signal of the Q-terminal to an L-level to turn off the switching device SW1.

Meanwhile, during a period (hereinafter, referred to as "OFF period") in which the switching device SW1 is turned off, the capacitor C1 is charged by the regeneration current flowing through the secondary winding of the transformer T1, and the voltage across the primary winding of the transformer T1 gradually decreases. Upon the voltage across the primary winding of the transformer T1 reaching 0 (i.e., stopping the regeneration current), the differentiator DV1 outputs a pulse signal to the S-terminal of the flip flop circuit FF1 through the timing controller 30. Upon the pulse signal is supplied to the S-terminal, the flip flop circuit FF1 shifts the level of the output signal of the Q-terminal to an H-level to turn off the switching device SW1.

The power supply 1 is configured to repeat the above-mentioned operations. The delay time in the timing controller 30 is set to 0 in a normal operation of the power supply 1.

Therefore, the ON duty ratio of the switching device SW1 increases and thus the output current Io of the DC-DC converter 2 increases, as increase in the primary current instruction value Ic supplied from the switching control circuit 3 to the comparator CP1.

In an example, the timing controller 30 is configured to be supplied a delay instruction signal from an input voltage judge 37 (described in detail later). The timing controller 30 is configured to determine the delay time according to the delay instruction signal, for example.

As shown in FIG. 1, the control circuit 7 further includes voltage-dividing resistors R1 and R2, an output voltage detection circuit VD2, a resistor R3, and an output current detection circuit CD2. The switching control circuit 3 further includes an average output voltage calculator 31 and an average output current calculator 32.

The voltage-dividing resistors R1 and R2 are connected in series to each other and are connected across the output terminals of the DC-DC converter 2. The output voltage detection circuit VD2 is electrically connected to a junction of the voltage-dividing resistors R1 and R2 to measure an output voltage Vo of the DC-DC converter 2 (hereinafter, referred to simply as "output voltage Vo"). The output voltage detection circuit VD2 is configured to, for example, appropriately convert (such as A/D conversion and the like) a voltage obtained by dividing the output voltage of the DC-DC converter 2 by the voltage-dividing resistors R1 and R2, and to output the obtained result (e.g., an obtained value of the voltage) to the switching control circuit 3 (specifically, to the average output voltage calculator 31). The average output voltage calculator 31 is configured, for example, to average the values of the output voltage Vo, measured by the output voltage detection circuit VD2, over a latest predetermined time period, to obtain an average output voltage value E(Vo).

The resistor R3 is so-called a shunt resistor, and is connected between a negative output terminal of the DC-DC converter 2 and a negative output terminal of the power supply 1. The output current detection circuit CD2 is configured to measure an output current Io of the DC-DC converter 2 (hereinafter, referred to simply as "output current Io") based on a voltage across the resistor R3. The output current detection circuit CD2 is configured to, for example, appropriately convert (such as A/D conversion and the like) the voltage across the resistor R3, and to output the obtained result (e.g., an obtained value corresponding to the output current Io) to the switching control circuit 3 (specifically, to the average output current calculator 32). The average output current calculator 32 is configured, for example, to average the values of the output current Io, measured by the output current detection circuit CD2, over a latest predetermined time period to obtain an average output current value E(Io).

The switching control circuit 3 further includes a target value outputter 33 and a calculator 34.

The target value outputter 33 is configured to output a target value (hereinafter, referred to as "current instruction value Ia") of the output current Io. The calculator 34 is configured to calculate the primary current instruction value Ic based on the current instruction value Ia supplied from the target value outputter 33, and output the resultant value (the primary current instruction value Ic) to the comparator CP1.

In the example of FIG. 1, the calculator 34 is configured to generate the primary current instruction value Ic such that the average output current value E(Io) outputted from the average output current calculator 32 approaches the current instruction value Ia outputted from the target value outputter 33. Specifically, the calculator 34 is configured to: increase the primary current instruction value Ic when the average output current value E(Io) is smaller than the current instruction value Ia; and to decrease the primary current instruction value Ic when the average output current value E(Io) is larger than the current instruction value Ia. Consequently, it is possible to achieve a feedback operation by which the output current Io becomes close to the current instruction value Ia (namely, constant current control).

Note that in a configuration where the target value outputter 33 is configured to use the average output voltage value E(Vo) from the average output voltage calculator 31 for calculating the current instruction value Ia, it is possible to achieve a feedback operation to keep the output power of the DC-DC converter 2 at constant (namely, constant power control).

The switching control circuit 3 further includes an ON time limiter 35 and an OFF time limiter 36.

The ON time limiter 35 is configured to be supplied a signal corresponding to the pulse signal input to the S-terminal of the flip flop circuit FF1. The ON time limiter 35 is configured to measure a length of the ON period (namely, a period of time in which the switching device SW1 is kept turned on; an elapsed time from a time point when the switching device SW1 is turned on; hereinafter referred to as "ON time"). The ON time limiter 35 is configured to, upon the ON time reaching the maximum ON time Ton-max, output a pulse signal to the R-terminal of the flip flop circuit FF1 through the second OR gate OR2 to forcibly turn off the switching device SW1. Hence, it is possible to suppress excessive increase in the primary current I1 even when a malfunction occurs in the primary current detection circuit CD1, for example. A maximum ON time Ton-max during the normal operation of the power supply 1 may be a fixed value, or be determined by a calculation based on the output voltage Vo, the output current Io, the input voltage Vi, and the like. The maximum ON time Ton-max can be determined by the equation:

$$Ton\text{-}max = \frac{2L \cdot Vo \cdot Io}{\eta} \left( \frac{1}{Vi} + \frac{n}{Vo} \right)^2$$

where "Vo" denotes the output voltage of the DC-DC converter 2, "Io" denotes the output current of the DC-DC converter 2, "η" denotes a circuit efficiency of the DC-DC converter 2, "n" denotes a turn ratio of the transformer T1, and "L" denotes an inductance of the primary winding of the transformer T1, for example. Strictly speaking, the ON time limiter 35 is configured to use, as the output voltage Vo, the output current Io and the input voltage Vi, their average values E(Vo), E(Io), and E(Vi), respectively, for calculating the maximum ON time Ton-max. Furthermore, the ON time limiter 35 is configured to store (have) upper and lower limit values regarding the maximum ON time Ton-max. If the maximum ON time Ton-max obtained by the calculation is larger than the upper limit value, the upper limit value is used as the maximum ON time Ton-max. If the maximum ON time Ton-max obtained by the calculation is less than the lower limit value, the lower limit value is used as the maximum ON time Ton-max. In short, the control circuit 7 of the embodiment includes the ON time limiter 35 configured to determine the maximum ON time Ton-max based on an average E(Vi) of the input voltage Vi from the DC power supply 51.

Therefore, the control circuit 7 is configured to turn off the switching device SW1 when the primary current I1 reaches the primary current instruction value Ic, or when the ON time of the switching device SW1 reaches the maximum ON time Ton-max.

In a similar manner, the OFF time limiter 36 is configured to be supplied a signal corresponding to the pulse signal input to the R-terminal of the flip flop circuit FF1. The OFF time limiter 36 is configured to measure a length of the OFF period (namely, a period of time in which the switching device SW1 is kept turned off; an elapsed time from a time point when the switching device SW1 is turned off; hereinafter referred to as "OFF time"). The OFF time limiter 36 is configured to, upon the OFF time reaching a maximum OFF time Toff-max, output a pulse signal to the S-terminal of the flip flop circuit FF1 through the first OR gate OR1 to forcibly turn on the switching device SW1. Hence, it is possible to avoid stopping the output of the power supply 1 even when a malfunction occurs in the differentiator DV1, for example. Also, it is possible to keep the frequency of a noise, which may generate along with the operation of the switching device SW1, at relatively high level.

Therefore, the control circuit 7 is configured to turn on the switching device SW1 when the delay time, which is set to 0 during the normal operation, elapses from a time point at which the regeneration current stops or when the OFF time of the switching device SW1 reaches the maximum OFF time Toff-max. In a case where the maximum OFF time Toff-max is shorter than a length of time required for the regeneration current stopping flowing (reaching to 0), the DC-DC converter 2 operates in, so called, "Continuous Current Mode (CCM)". In a case where the maximum OFF time Toff-max is equal to or more than the length of the time required for the regeneration current stopping flowing and also the delay time in the timing controller 30 is set to "0", the DC-DC converter 2 operates in, so called, "Boundary Current Mode (BCM)". In a case where the maximum OFF time Toff-max is equal to or more than the length of the time required for the regeneration current stopping flowing and also the delay time in the timing controller 30 is set to a value larger than 0, the DC-DC converter 2 operates in, so called, "Discontinuous Current Mode (DCM)".

The control circuit 7 further includes a circuit temperature measuring circuit 12 and a light source temperature measuring circuit 13. The circuit temperature measuring circuit 12 is configured to measure a temperature of a circuit component(s) of the power supply 1. The light source temperature measuring circuit 13 is configured to measure a temperature of the light source 4. The circuit temperature measuring circuit 12 is disposed near a circuit component (such as the switching device SW1) that generates relatively large amount of heat. The light source temperature measuring circuit 13 is disposed near the light source 4. Each of the circuit temperature measuring circuit 12 and the light source temperature measuring circuit 13 includes, for example, a thermistor.

The target value outputter 33 of the switching control circuit 3 is configured to decrease the current detection value Ia as increase in any of the temperatures measured through the circuit temperature measuring circuit 12 and the light source temperature measuring circuit 13. Hence, it is possible to suppress generating undesired heat in the circuit component of the power supply 1 and the light source 4.

The control circuit 7 further includes an input voltage detection circuit VD1. The input voltage detection circuit VD1 is configured to measure the input voltage Vi from the DC power supply 51 to the DC-DC converter 2. The input voltage detection circuit VD1 includes, for example, voltage-dividing resistors.

The switching control circuit 3 further includes the input voltage judge 37. The input voltage judge 37 is configured to determine whether the input voltage Vi measured through the input voltage detection circuit VD1 is decreased or not. The input voltage judge 37 is configured to obtain values of the input voltage Vi from the input voltage detection circuit VD1 at constant intervals, and store the predetermined number of latest (for example, last four of) obtained values. That is, the input voltage judge 37 is configured to, upon obtaining a new value of the input voltage Vi, discard the oldest one of the stored values. Therefore, the input voltage judge 37 always stores the predetermined numbers (four, for example) of values of the input voltage Vi. The input voltage judge 37 is also configured to, upon obtaining a new value of the input voltage Vi from the input voltage detection circuit VD1, calculate an average of new set of stored values of the input voltage Vi to obtain the average input voltage value E(Vi). The input voltage judge 37 is configured to use the average input voltage value E(Vi) and also a single value of the input voltage Vi for the judgment about the input voltage Vi.

The switching control circuit 3 (input voltage judge 37) of the embodiment has (stores) a first threshold Vth1, a second threshold Vth2 which is lower than the first threshold Vth1, and a third threshold Vth3 which is higher than the first threshold Vth1. The first to third thresholds Vth1 to Vth3 are each lower than a rated voltage of the DC power supply 51. For example, the first threshold Vth1 corresponds to a lighting maintaining voltage by which the light source 4 can be kept to be lit. For example, the second threshold Vth2 is used for determining whether the switching control circuit 3 performs an output suppressing operation (described later). For example, the third threshold Vth3 is used for determining whether the switching control circuit 3 starts lighting the light source 4. The switching control circuit 3 (input voltage judge 37) also has (stores) a predetermined holding period Tth1.

The switching control circuit 3 (input voltage judge 37) is configured to obtain a value(s) of the input voltage Vi from the input voltage detection circuit VD1.

The switching control circuit 3 is configured to determine whether a duration time in which the input voltage Vi from the DC power supply 51 is kept lower than the first threshold Vth1 reaches the holding period Tth1. The switching control circuit 3 is configured to, when detecting that the duration time in which the input voltage Vi is kept lower than the first threshold Vth1 reaches the holding period Tth1, stop operating the switching device SW1.

The switching control circuit 3 is also configured to determine whether the input voltage Vi is lower than the second threshold Vth2. The switching control circuit 3 is configured to, after detecting that the input voltage Vi is lower than the second threshold Vth2, perform the output suppressing operation. The switching control circuit 3 may be configured to, immediately after detecting that the input voltage Vi is lower than the threshold Vth2, perform an output suppressing operation. The output suppressing operation will be described in detail later.

The switching control circuit 3 is also configured, under a condition where the switching control circuit 3 stops operating the switching device SW1, not to start operating the switching device SW1 until the switching control circuit 3 detecting that the input voltage Vi from the DC power supply 51 is the threshold Vth3 or more.

Figure 3:
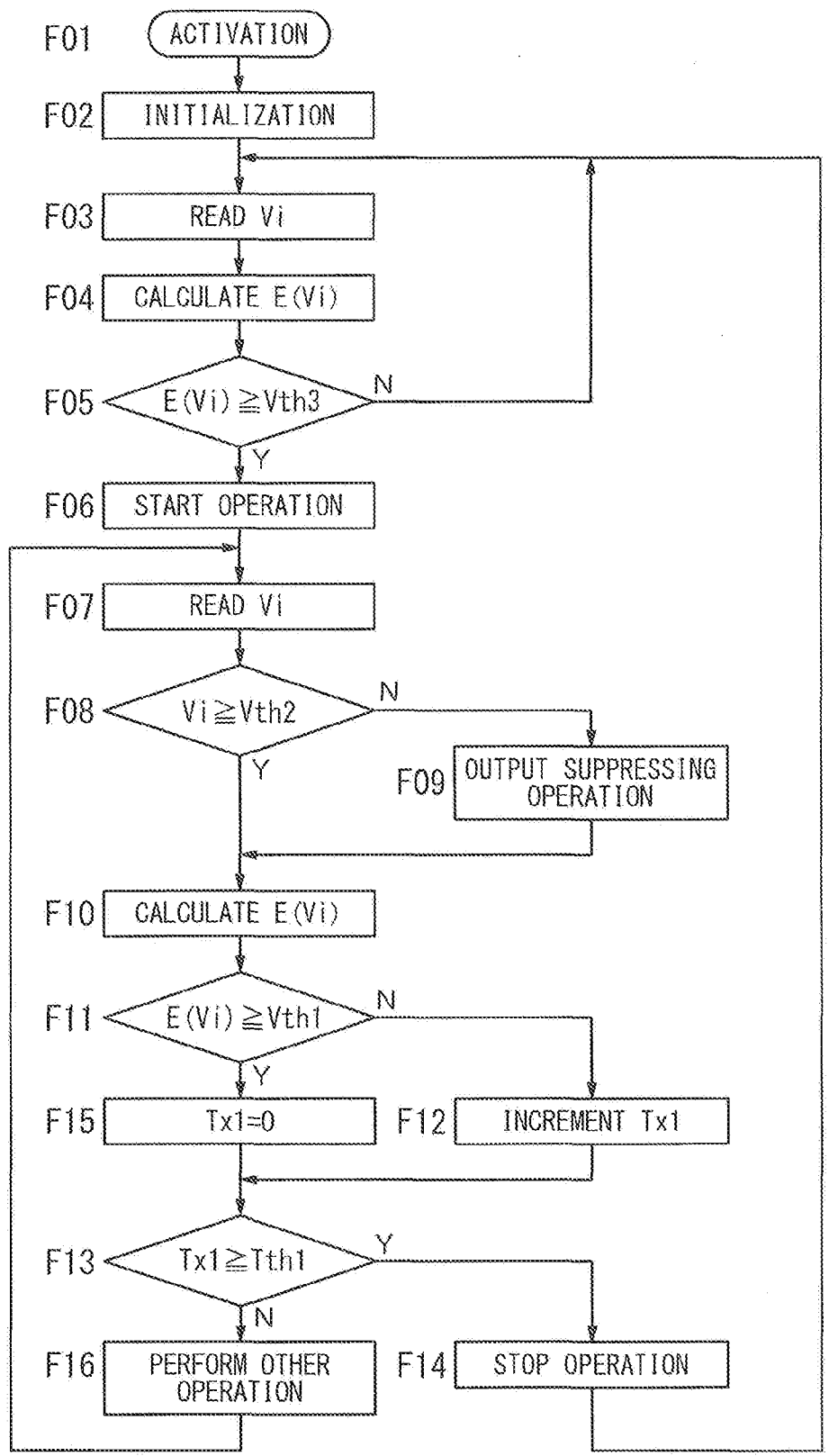
FIG. 3 is a flow chart of an example of an operation of a control circuit of the power supply.

An example of an operation of the switching control circuit 3 will be described with reference to FIG. 3.

Upon the switch 52 being turned on and the switching control circuit 3 being activated by the power from the DC power supply 51 (F01), the switching control circuit 3 first performs the initializing process of resetting the parameters used in the following operation (F02). Then, the input voltage judge 37 obtains values of the input voltage Vi from the input voltage detection circuit VD1 (F03). When obtaining the predetermined number of values of the input voltage V1, the input voltage judge 37 of the switching control circuit 3 calculates the average input voltage value E(Vi) (F04). The input voltage judge 37 of the switching control circuit 3 then compares the obtained average input voltage value E(Vi) with the third threshold Vth3 (9 [V], for example) which is lower than the rated voltage (12 [V], for example) of the DC power supply 51 (F05). In a case where the average input voltage value E(Vi) is equal to or more than the third threshold Vth3 ("Y" in the step F05), the timing controller 30 supplies a pulse signal to the first OR gate OR1 by an instruction from the input voltage judge 37, and thus the switching control circuit 3 starts operating the switching device SW1 (F06). On the other hand, if the average input voltage value E(Vi) is lower than the third threshold Vth3 ("N" in the step F05), the switching control circuit 3 returns to the step F03 without starting operating the switching device SW1.

After starting the operation of the switching device SW1, the input voltage judge 37 obtains a new value of the input voltage Vi from the input voltage detection circuit VD1 (F07), and compares the obtained value with the second threshold Vth2 (4.5 [V], for example) which is lower than the third threshold Vth3 (F08). If the obtained value of the input voltage Vi is lower than the second threshold Vth2 ("N" in the step F08), the control circuit 3 performs the output suppressing operation (F09).

In a case where the value of the input voltage Vi is equal to or more than the second threshold Vth2 ("Y" in the step F08), the input voltage judge 37 of the switching control circuit 3 then calculates the average input voltage value E(Vi) (F10). The input voltage judge 37 of the switching control circuit 3 then compares the obtained average input voltage value E(Vi) with the first threshold Vth1 which is higher than the third threshold Vth3 as well as lower than the second threshold Vth2 (F11). If the average input voltage value E(Vi) is lower than the first threshold Vth1 ("N" in the step F11), the switching control circuit 3 increments a first count Tx1 (F12), and then compares the resultant first count Tx1 with the predetermined holding period (first holding period) Tth1 (F13). If the first count Tx1 (which corresponds to a length of time during which the input voltage Vi is continuously lower than the first threshold Vth1) reaches the holding period Tth1 ("Y" in the step F13), the switching control circuit 3 stops operating the switching device SW1 (F14) and returns to the step F03. Specifically, in the step F14, the input voltage judge 37 instructs both the timing controller 30 and the OFF time limiter 36 to stop operating, thereby keeping the switching device SW1 turning off, and thus the DC-DC converter 2 stops outputting electric power. For example, the first threshold Vth1 is set to 6 [V], and the holding period Tth1 is set to 60 [ms], so that the DC-DC converter 2 stops operating according to the step F14 when the input voltage Vi is decreased due to activation of the starter of the engine.

After the switching control circuit 3 stops operating the switching device SW1 in the step F14 and returns to the step F03, the switching control circuit 3 does not restart operating the switching device SW1 until the average input voltage value E(Vi) increases to the third threshold Vth3 or more. Note that, if the third threshold Vth3 is set to be equal to the first threshold Vth1 and when the input voltage Vi fluctuates around the first threshold Vth1, there is a concern that the switching device SW1 is repeatedly turned on and off and thus the light source 4 flickers. On the contrary, in the embodiment, the third threshold Vth3 is set to be higher than the first threshold Vth1. It is accordingly possible to suppress the repeated turning On and Off of the switching device SW1 and flickering of the light source 4 even when the input voltage Vi fluctuate as stated above.

Referring back to FIG. 3, in a case where the average input voltage value E(Vi) is equal to or more than the first threshold Vth1 ("Y" in the step F11), the switching control circuit 3 resets the first count Tx1 (F15). Then, the switching control circuit 3 goes to the step F16 passing through F13, because the first count Tx1 is reset and is lower than the holding period Tth1.

If the average input voltage value E(Vi) is lower than the first threshold Vth1 ("N" in the step F11) and the first count Tx1 is smaller than the holding period Tth1 ("N" in the step F13), the switching control circuit 3 goes to the next step F16 without resetting the first count Tx1.

In the step F16, the control circuit 7 performs the feedback operation using the target value outputter 33, the calculator 34 and the like. Also, in the step F16, the control circuit 7 may perform the judgment about presence or absence of malfunctions, stop operating the switching device SW1 (e.g., go to the step F14) as a result of determination of the presence of a malfunction, or the like. Examples of the malfunction include: a malfunction in the input power supply which is determined based on an excessive input voltage Vi; a short circuit which is determined based on an excessive output current Io; no-load state (opened-end state) which is determined based on an excessive output voltage Vo; and the like, for example. The delay time in the timing controller 30 may be set to a value larger than 0 in the step F16, if the average input voltage value E(Vi) is larger than the rated voltage (for example, 12 [V]) or the current instruction value Ia is relatively small. After the operations in the step F16 completed, the switching control circuit 3 returns to the step F07.

The output suppressing operation in the step F09, which is a characteristic feature of the embodiment, is described in detail hereinafter.

First, an operation according to a reference example in which a switching control circuit 7 does not perform the output suppressing operation in the step F09 is described with reference to FIG. 13.

As described above, the control circuit 7 is configured to turn off the switching device SW1 when the primary current I1 reaches the primary current instruction value Ic or when the ON time of the switching device SW1 reaches the maximum ON time Ton-max. Also, the control circuit 7 is configured to turn on the switching device SW1 when the delay time, which is set to 0 during the normal operation, elapses from a time point at which the regeneration current stops, or when the OFF time of the switching device SW1 reaches the maximum OFF time Toff-max.

Figure 13:
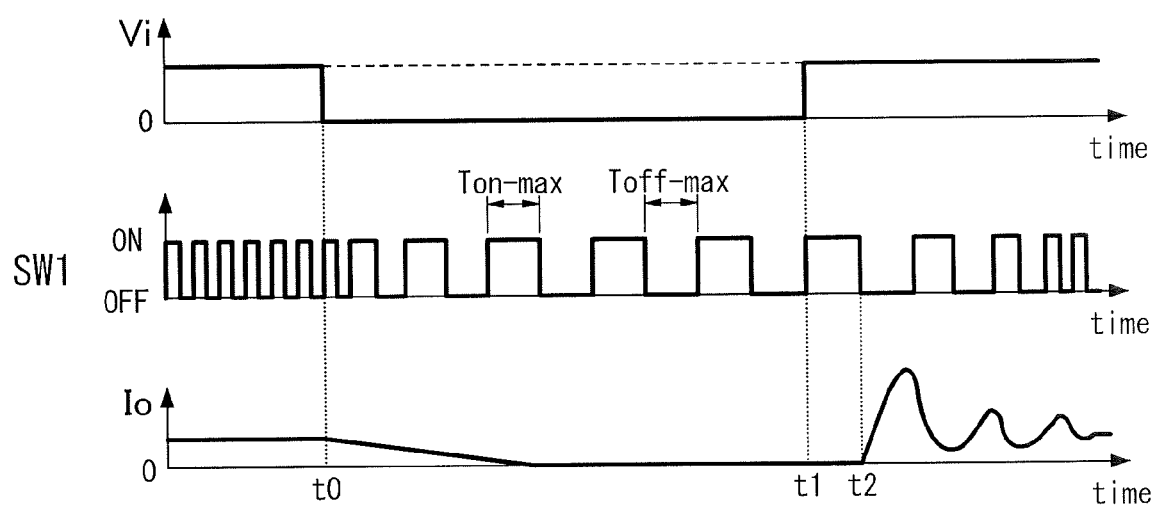
FIG. 13 is a diagram illustrating temporal changes of an input voltage, an on-off state of a switching device, and an output current according to a reference example of an operation of the power supply.

In the example of FIG. 13, after the input voltage Vi reaches to 0 at a time point t0, the primary current I1 does not increase even the switching device SW1 is turned on, and thus the primary current I1 never reaches the primary current instruction value Ic. Therefore, upon the ON time reaching the maximum ON time Ton-max, the switching control circuit 3 (the ON time limiter 35) outputs a pulse signal to turn off the switching device SW1. Note that, in this example, the control circuit 7 determines the maximum ON time using the equation described above based on an average E(Vi) of the input voltage Vi from the DC power supply, and the maximum ON time Ton-max gradually increases during several cycles after the time point t0. Then, after the maximum ON time Ton-max reaches the upper limit value described above, the maximum ON time Ton-max is kept at this value.

Also, in the example of FIG. 13, after the input voltage Vi reaches to 0, the regeneration current does not flow even the switching device SW1 is turned off because energy is not accumulated in the transformer T1. Therefore, upon the OFF time reaching the maximum OFF time Ton-max, the switching control circuit 3 (the OFF time limiter 36) outputs a pulse signal to turn on the switching device SW1.

In this reference example, the switching control circuit 3 does not perform the output suppressing operation, and maintain the maximum ON time of the normal operation, even after detecting that the input voltage Vi is lower than the second threshold Vth2 (i.e., even after the time point t0). Note that, the normal operation indicates an operation of the power supply 1 under a condition where the input voltage Vi is the second threshold Vth2 or more. If the input voltage Vi returns to the original voltage (see a time point t1) under a condition where the ON time is increased, there is a concern that excessive energy is accumulated in the transformer T1 and as a result excessive current is supplied to the light source 4 at a time point t2 when the switching device SW1 is next turned off.

On the contrary, the control circuit 7 of the embodiment is configure, after detecting that the input voltage Vi is lower than the second threshold Vth2, to perform the output suppressing operation described below to prevent the light source 4 from being supplied an excess current.

Figure 4:
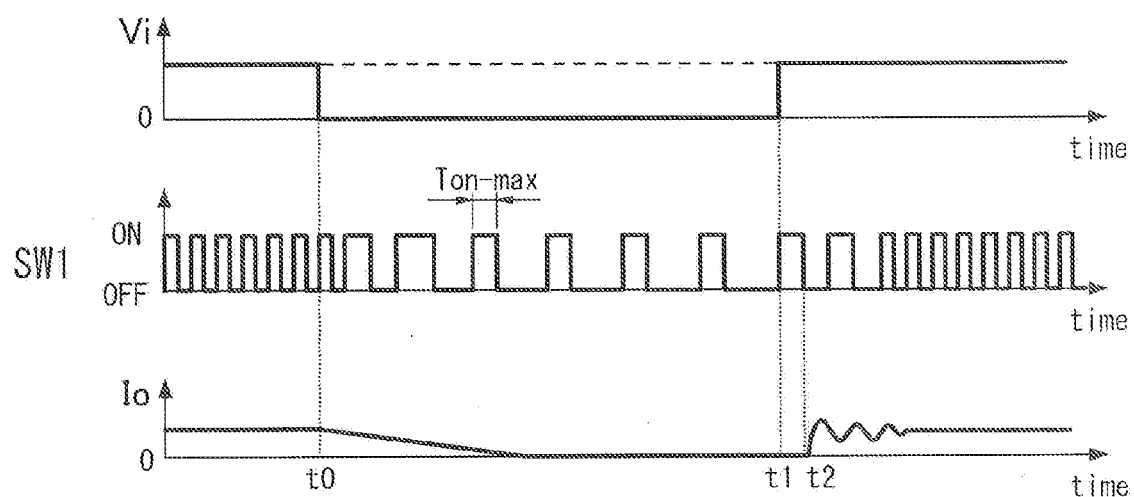
FIG. 4 is a diagram illustrating temporal changes of an input voltage, an on-off state of the switching device, and an output current, according to an example of an operation of the power supply.

In a first aspect of the output suppressing operation, the control circuit 7 more shorten the maximum ON time Ton-max than that during the normal operation. In other words, the switching control circuit 3 (the ON time limiter 35) changes the value of the maximum ON time Ton-max from a first value during the normal operation to a second value which smaller than the first value. FIG. 4 shows an example of temporal changes of the input voltage Vi, the on-off state of the switching device SW1, and the output current Io according to the first aspect. As shown in FIG. 4, after the decrease in the input voltage Vi (at a time point t0), the maximum ON time Ton-max is more shortened, and as a result the ON time of the switching device SW1 is more shortened than that of a case of FIG. 13. The maximum ON time Ton-max during the output suppressing operation may be a fixed value, or a value obtained by subtracting a predetermined value from the maximum ON time Ton-max during the normal operation, for example.

In a second aspect of the output suppressing operation, the control circuit 7 lengthens the OFF time of the switching device SW1 than the maximum OFF time Toff-max during the normal operation. Specifically, the control circuit 7 is configured, in the normal operation, to control the DC-DC converter 2 (control the operation of the switching device SW1) under the Continuous Current Mode (CCM) of turning on the switching device SW1 before the regeneration current stops flowing in an OFF period (a period in which the switching device SW1 is turned off), and, in the output suppressing operation, to lengthen the OFF time of the switching device SW1 than the maximum OFF time Toff-max during the normal operation. For example, the switching control circuit 3 increases (lengthens; extends) the delay time of the timing controller 30 than the delay time of a case where the input voltage Vi is larger than the second threshold Vth2. Also, the switching control circuit 3 changes the maximum OFF time Toff-max so that the maximum OFF time Toff-max becomes longer than the length of time in which the regeneration current flows. In other words, in the second aspect of the output suppressing operation, the switching control circuit 3 delays the timing of turning On of the switching device SW1 so that the timing of turning On of the switching device SW1 is later than a time point when the regeneration current stops flowing through the secondary winding of the transformer T1. In this case, with the second aspect of the output suppressing operation, the DC-DC converter 2 operates according to Discontinuous Current Mode (DCM).

Figure 5:
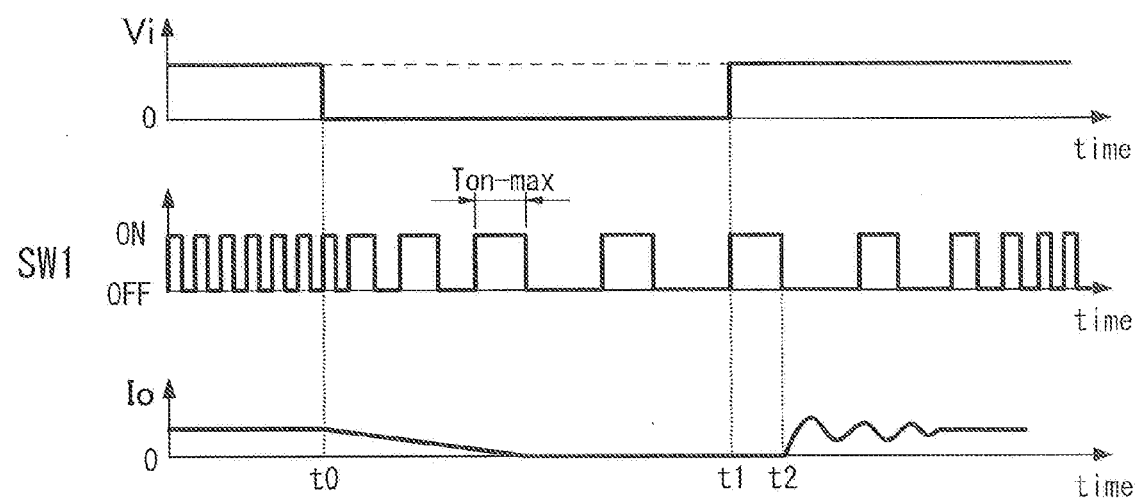
FIG. 5 is a diagram illustrating temporal changes of the input voltage, the on-off state of the switching device, and the output current, according to an example of an operation of the power supply.

FIG. 5 shows an example of temporal changes of the input voltage Vi, the on-off state of the switching device SW1, and the output current Io according to the second aspect. Note that, in a case where the control circuit 7 is configured to control the DC-DC converter 2 under the Continuous Current Mode in the normal operation, the switching device SW1 is turned on before the regeneration current stops flowing. In this case, therefore, if the input voltage Vi decreases and then returns to the original voltage, there is a concern that the remained regeneration current, in addition to the energy accumulated in the transformer T1 (inductor) during the increased ON time, (i.e., an excess current) may be supplied to the light source 4. On the contrary, with this second aspect, the control circuit 7 lengthens the OFF time of the switching device SW1 than the maximum OFF time Toff-max during the normal operation (for example, lengthens the OFF time of the switching device SW1 so that the DC-DC converter 2 operates, in the output suppressing opeation, under the Discontinuous Current Mode), and accordingly it is possible to prevent the light source 4 from being supplied an excess current.

Figure 6:
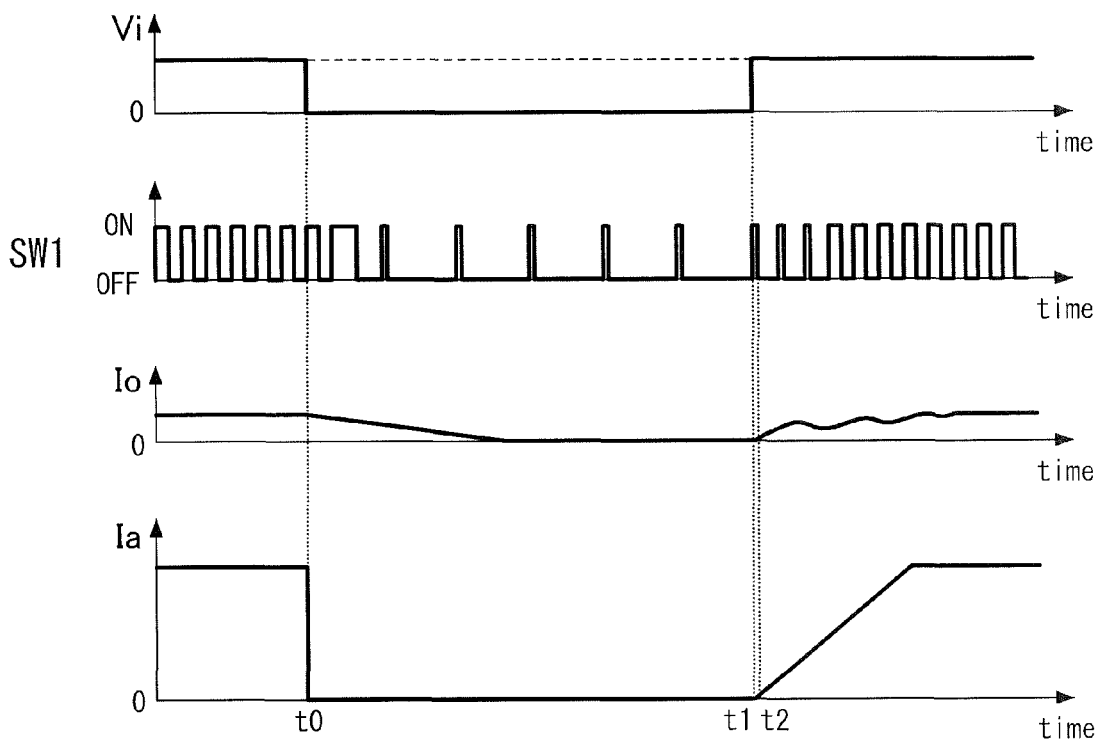
FIG. 6 is a diagram illustrating temporal changes of the input voltage, the on-off state of the switching device, the output current, and a current instruction value according to an example of an operation of the power supply.

In a third aspect of the output suppressing operation, the control circuit 7 more shorten the maximum ON time Ton-max than that during the normal operation by making a threshold (the primary current instruction value Ic) of the primary current I1 flowing through the switching device SW1 smaller than that during the normal operation. For example, in this aspect, the target value outputter 33 decreases the current instruction value Ia, which is input to the calculator 34, (sets to 0, for example) from a value during the normal operation (i.e., during a period in which the input voltage Vi is equal to or larger than the second threshold Vth2). FIG. 6 shows an example of temporal changes of the input voltage Vi, the on-off state of the switching device SW1, the output current Io, and the current instruction value Ia according to the third aspect. Note that, in the example of FIG. 6, the primary current instruction value Ic is updated after a delayed time from a time point when the current instruction value Ia is decreased, due to the processing time required in the switching control circuit 3. Hence, the switching device SW1 is operated with reflecting the decrease in the current instruction value Ia after a certain time. Also, in the example of FIG. 6, after the input voltage Vi increases to the second threshold Vth2, the switching control circuit 3 gradually increases the current instruction value Ia. Note that, similar effect can be obtained by the calculator 34 decreasing the primary current instruction value Ic, with a case where the target value outputter 33 decreases the current instruction value Ia.

Among the above described kinds of output suppressing operation, the second aspect of the output suppressing operation (the output suppressing operation in which the timing of turning On of the switching device SW1 is delayed) and the third aspect of the output suppressing operation (the output suppressing operation in which the current instruction value Ia or the primary current instruction value Ic is decreased) can be achieved without providing the ON time limiter 35 and the first OR gate OR1.

The above mentioned aspects of the output suppressing operation can be appropriately combined. For example, in an aspect of the output suppressing operation, the switching control circuit 3 shortens the maximum ON time Ton-max as well as increasing the delay time.

Figure 7:
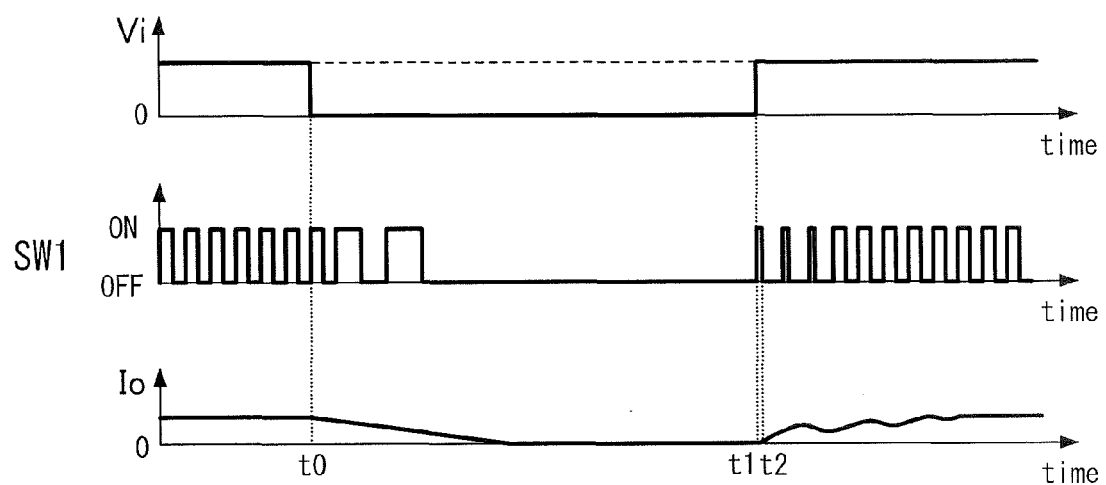
FIG. 7 is a diagram illustrating temporal changes of the input voltage, the on-off state of the switching device, and the output current, according to an example of an operation of the power supply.

In a variation of the embodiment, the switching control circuit 3 may be configured to, if the obtained value of the input voltage Vi is lower than the second threshold Vth2 ("N" in the step F08), go to the step F14 to stop operating the switching device SW1, thereby decreasing the output current Io down to, eventually 0. FIG. 7 shows an example of temporal changes of the input voltage Vi, the on-off state of the switching device SW1, and the output current Io according to the this variation.

By the above configuration, the output current Io is gradually decreased when the input voltage Vi is lower than the second threshold Vth2. Accordingly, excess increase in the output current Io caused by a control delay can be prevented, even when the input voltage Vi returns to the original voltage after the input voltage Vi decrease lower than the second threshold Vth2.

Also, the instantaneous value (single value) of the input voltage Vi is compared with the second threshold Vth2, the output current Io can be decreased even in an instantaneous decrease in the input voltage Vi, in contrast to a case where the average input voltage value E(Vi) is compared with the second threshold Vth2.

Figure 8:
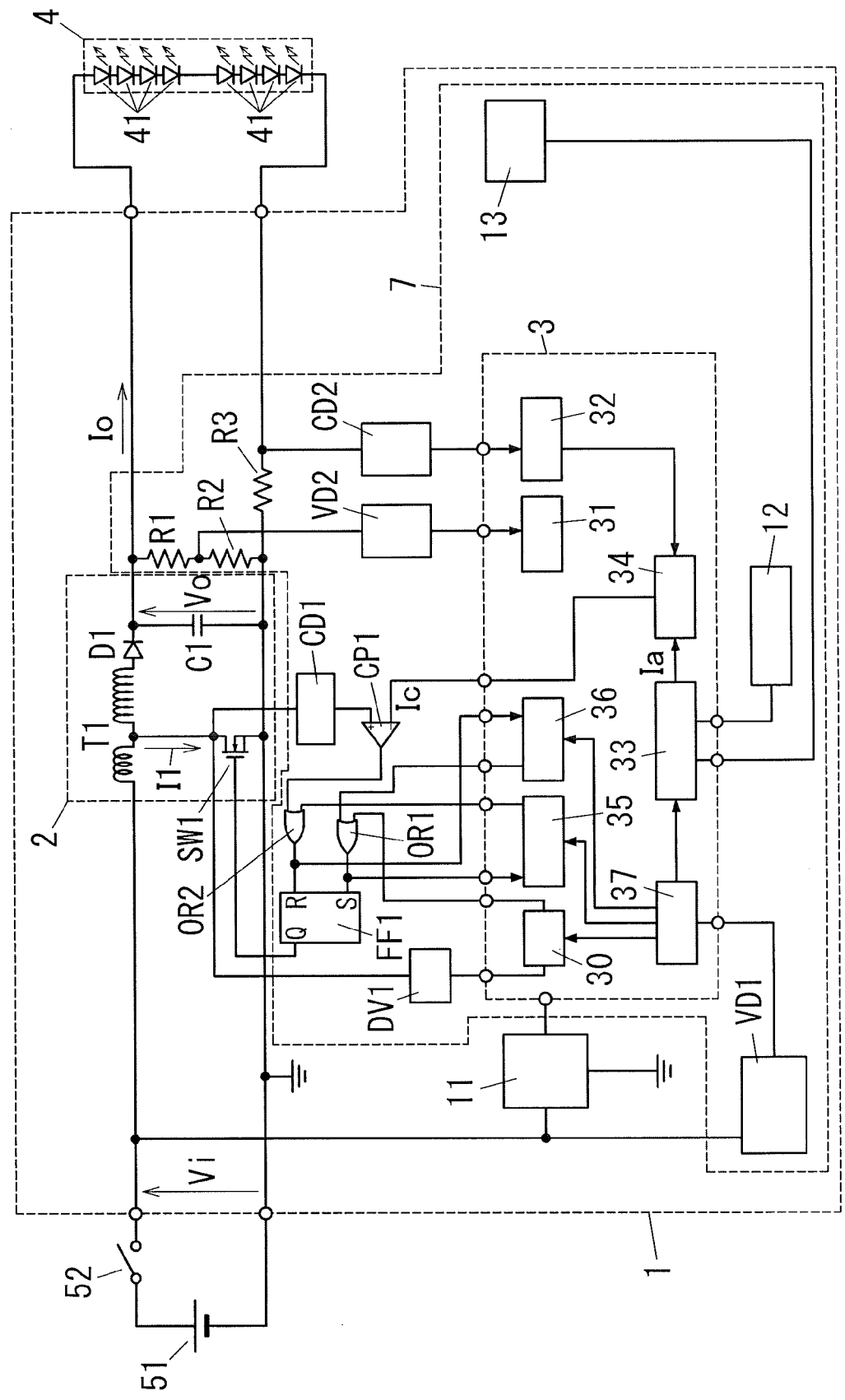
FIG. 8 is a circuit diagram of a power supply according to another example of the embodiment.

The DC-DC converter 2 is not limited to the flyback converter, and may be a boost converter shown in FIG. 8. In the example of FIG. 8, the transformer T1 is composed of, so-called an auto transformer including a winding which doubles as first and second windings.

Figure 9:
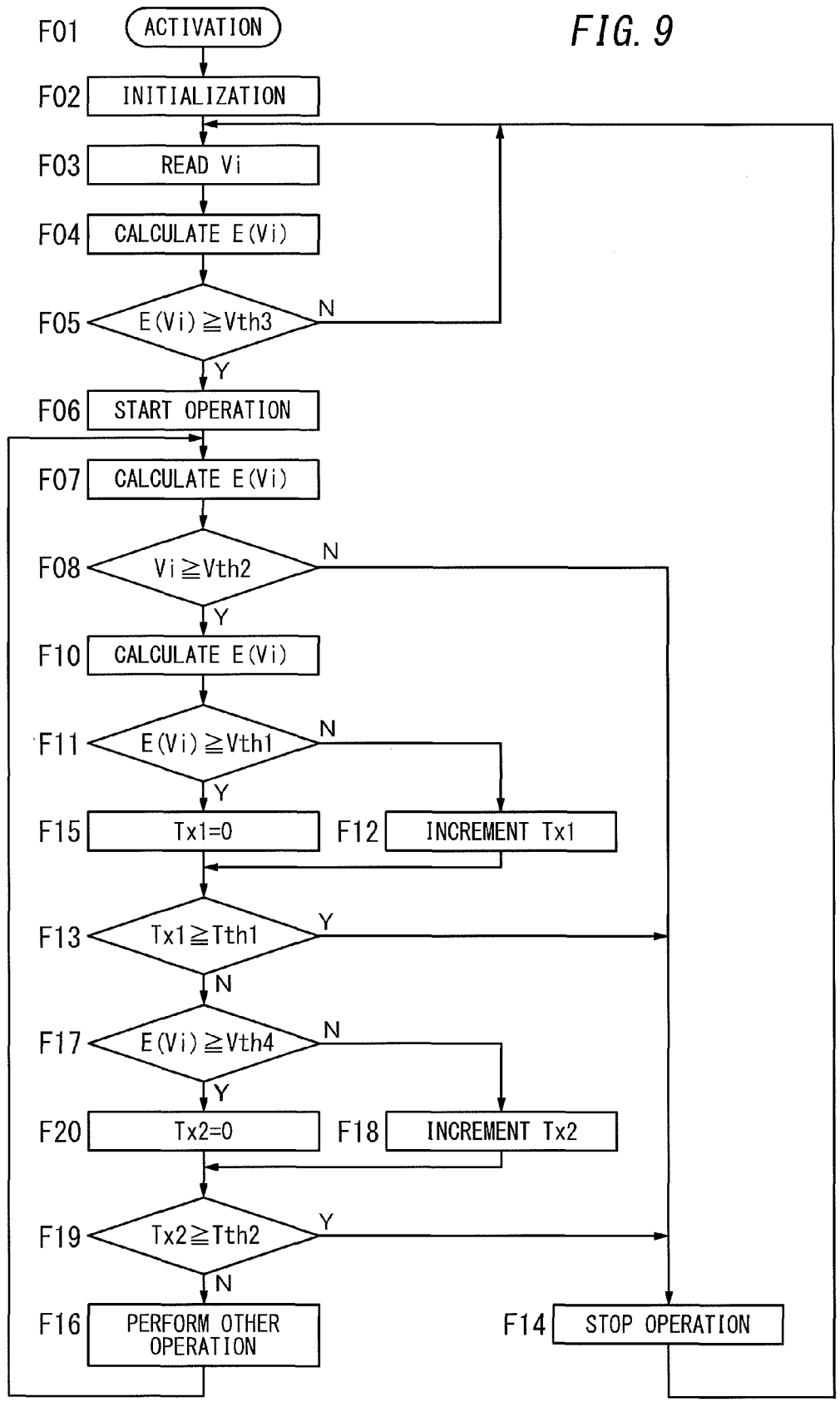
FIG. 9 is a flow chart of another example of an operation in a control circuit of the power supply.

The switching control circuit 3 may be configured to perform additional judgment operation according to steps F17 to F20 as shown in FIG. 9, by using a fourth threshold Vth4 (e.g., 7 [V]) which is larger than the first threshold Vth1 and a second holding period Tth2 (e.g., 150 [ms]) which is longer than the holding period (first holding period) Tth1. In detail, in the step F17, the input voltage judge 37 of the switching control circuit 3 compares the average input voltage value E(Vi) with the fourth threshold Vth4 (which is larger than the first threshold Vth1). If the average input voltage value E(Vi) is lower than the fourth threshold Vth4 ("N" in the step F17), the switching control circuit 3 increments a second count Tx2 (F18), and then compares the resultant second count Tx2 with the predetermined second holding period Tth2 (which is longer than the first holding period Tth1) (F19). If the second count Tx2 (which corresponds to a length of time during which the input voltage Vi is continuously lower than the fourth threshold Vth4) reaches the second holding period Tth2 ("Y" in the step F19), the switching control circuit 3 stops operating the switching device SW1 (F14). If the second count Tx2 is smaller than the second holding period Tth2 ("N" in the step F19), the switching control circuit 3 goes to the next step F16. In a case where the average input voltage value E(Vi) is equal to or more than the fourth threshold Vth4 ("Y" in the step F17), the switching control circuit 3 resets the second count Tx2 (F20), and then goes to the step F16 passing through the step F19. By adding the operations according to the steps F17 to F20, it is possible to further suppress the occurrence of excess increase in the output current Io when the input voltage Vi returns to the original voltage after the decrease.

The switching control circuit 3 may be configured to perform judgment operations according the step F11 using the first threshold Vth1, the step F08 using the second threshold Vth2 and the step F17 using the fourth threshold Vth4, by other order than that shown in FIG. 9. For example, the switching control circuit 3 may be configured to perform the judgment operation of the step F08 using the second threshold Vth2 and the output suppressing operation of the step F09 based on the judgment result, after the judgment operation according to the step F11 using the first threshold Vth1. Moreover, the control circuit 7 may further includes appropriate timer(s), and the operations according to the steps F11, F08 and F17 may be performed at timings determined by the timer, instead of the flowcharts shown in FIGS. 3 and 9.

Figure 10:
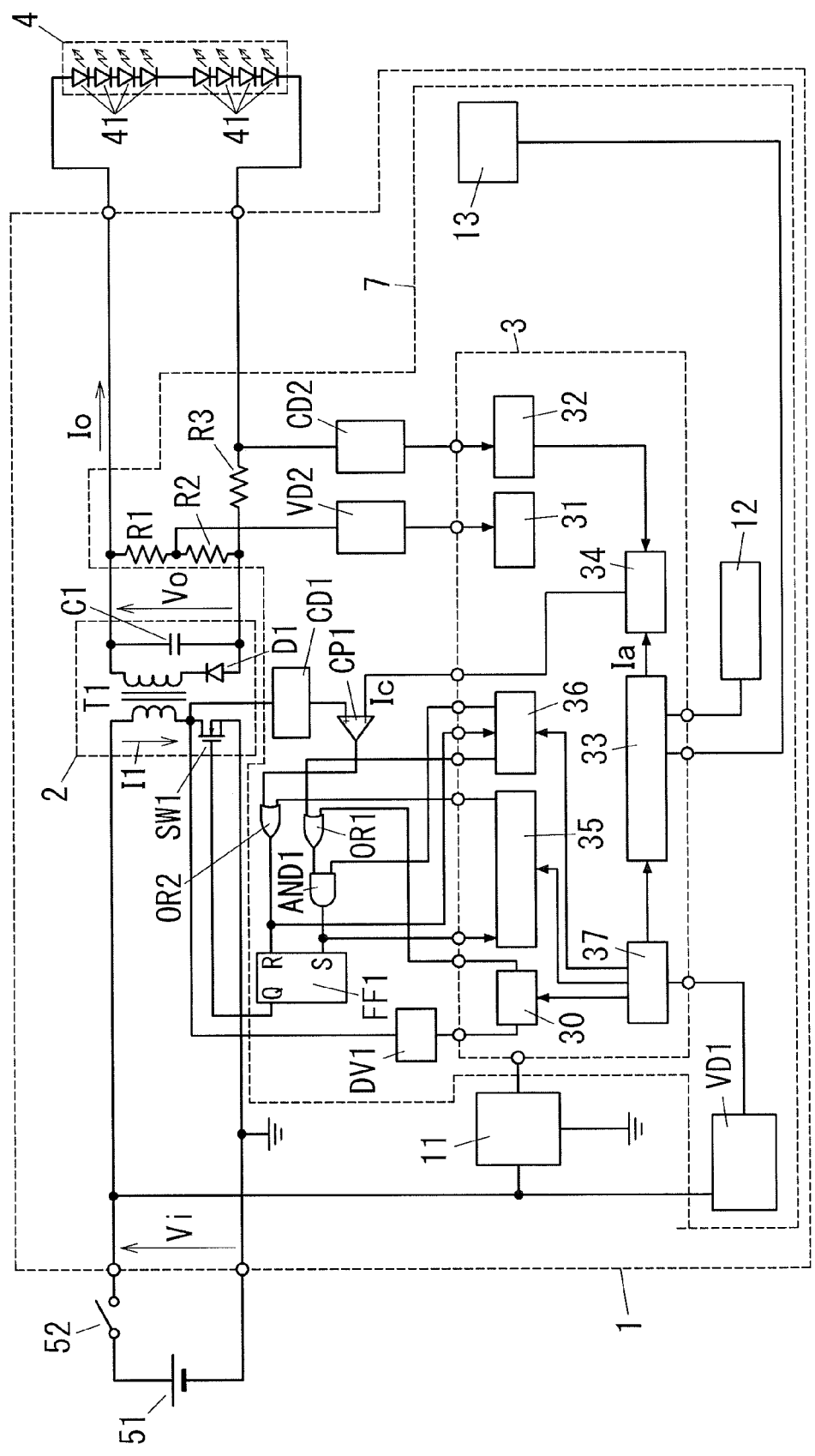
FIG. 10 is a circuit diagram of a power supply according to yet another example of the embodiment.

The power supply 1 may be configured not to turn on the switching device SW1 until the OFF time reaches a minimum OFF time. Specifically, as shown in FIG. 10, an AND gate AND1 is disposed between the S-terminal of the flip flop circuit FF1 and the first OR gate OR1, for example. One of input terminals of the AND gate AND1 is connected to the output terminal of the first OR gate OR1, and the other of the input terminals of the AND gate AND1 is connected to the OFF time limiter 36. The OFF time limiter 36 is configured to output, to the AND gate AND1, a signal which is in an L level during a period from a time when the switching device SW1 is turned off to a time when the minimum OFF time elapses, and in an H level during other period. In this configuration, the OFF time limiter 36 may be configured to more lengthen the minimum OFF time during the output suppressing operation than that during the normal operation (i.e., during a period in which the input voltage Vi is larger than the second threshold Vth2).

Figure 11:
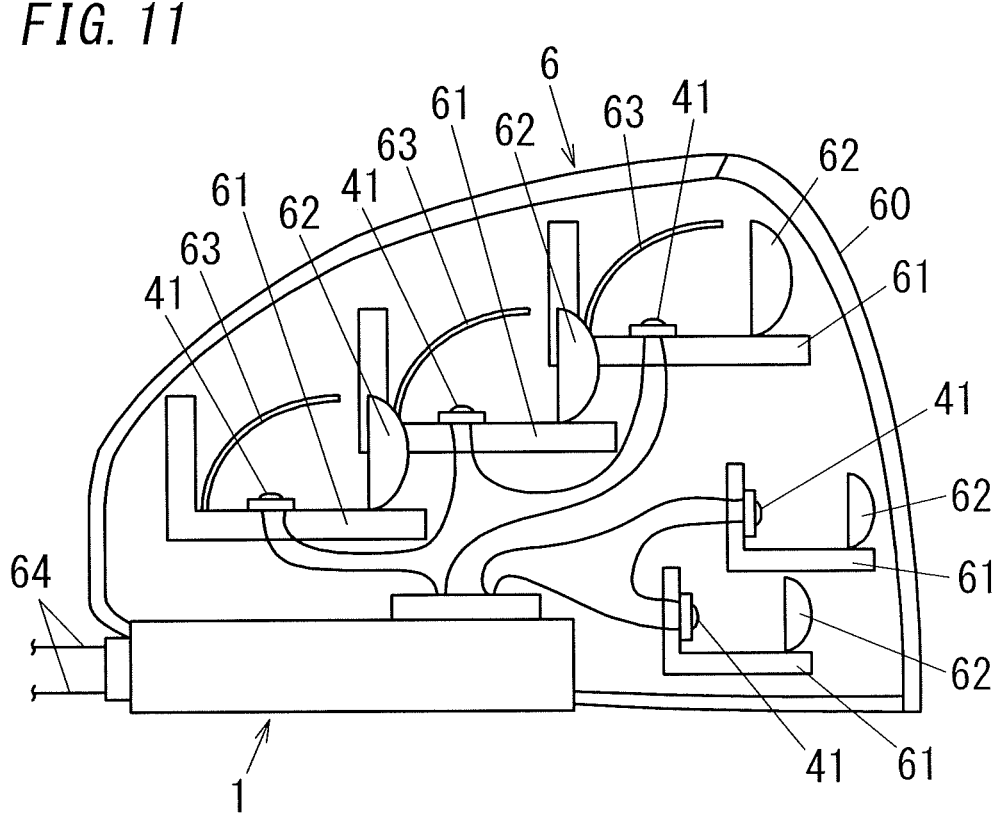
FIG. 11 is a schematic diagram of an example of a headlight device using the power supply of the embodiment.

The above-described power supply 1 may be used in a headlight device 6 shown in FIG. 11, for example. The headlight device 6 includes the power supply 1, light-emitting diodes 41 serving as a light source 4, and a housing 60 that houses the light-emitting diodes 41 and holds the power supply 1. Each of the light-emitting diodes 41 is fixed to a corresponding substrate 61 in the housing 60. Lenses 62 are fixed to respective substrate 61 in order to align the directions of emitted lights from the light-emitting diodes 41 to a common direction (to a right side in FIG. 11). Each of parts (lower two in FIG. 11) of the light-emitting diodes 41 is mounted so that its light emitting direction agrees to an axis of the corresponding lens 62, while each of the others (upper three in FIG. 11) of the light emitting diodes 41 is mounted so that its light emitting direction crosses with an axis of the corresponding lens 62. To each substrate 61 on which the light-emitting diode 41 is mounted so that its light emitting direction crosses with an axis of the corresponding lens 62, a reflector 63 is fixed in order to reflect the light emitted from the corresponding light-emitting diode 41 to the corresponding lens 62. At least part (right side wall in FIG. 11) of the housing 60 is formed of optically transparent material (such as polycarbonate) in order to allow the lights from the light-emitting diodes 41 to be passed through. As shown in FIG. 11, the power supply 1 is electrically connected to the DC power supply 51 and the switch 52 by two electric wires 64. The headlight device 6 as described above is well-known, and is not described in detail herein. Note that all circuit components constituting the power supply 1 may be housed in the housing 60, or part or all of them may be housed in a casing other than the housing 60.

Figure 12:
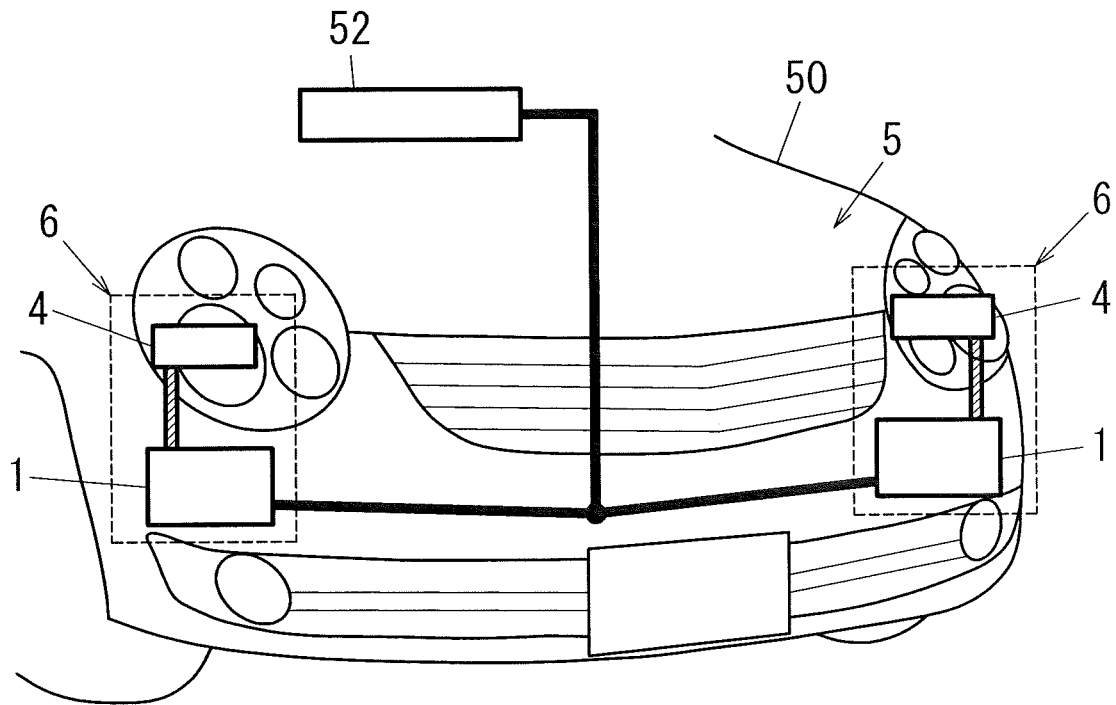
FIG. 12 is a schematic diagram of an example of a vehicle using the power supply of the embodiment.

The headlight device 6 may be used in a vehicle 5 including a vehicle body 50 in which the headlight device 6 is installed, as shown in FIG. 12. In the vehicle 5 shown in FIG. 12, two headlight devices 6 are turned on and off in a lump by one switch 52.

The light source 4 may include organic light-emitting device or other electric light source.

As described above, the power supply 1 of the embodiment includes the DC-DC converter 2 and the control circuit 7. The DC-DC converter 2 includes the switching device SW1, the inductor (transformer T1), and the capacitor C1. The inductor (transformer T1) is disposed so that energy is accumulated in the inductor (transformer T1) by an electric power from the external DC power supply 51 when the switching device SW1 is turned on. The capacitor C1 is configured to be charged by a regeneration current from the inductor (transformer T1) when the switching device SW1 is turned off. The control circuit 7 is configured to control switching operation of the switching device SW1 within ranges of the maximum ON time Ton-max and the maximum OFF time Toff-max. The control circuit 7 includes the input voltage detection circuit VD1 configured to measure the input voltage Vi from the DC power supply 51 to the DC-DC converter 2. The control circuit 7 is configured to compare the input voltage Vi measured through the input voltage detection circuit VD1 with the first threshold Vth1 and with the second threshold Vth2. The first threshold Vth1 is lower than a rated voltage of the DC power supply 51. The second threshold Vth2 is lower than the first threshold Vth1 and higher than 0. The control circuit 7 is configured, when detecting that a duration time Tx1 in which the input voltage Vi is kept lower than the first threshold Vth1 reaches the predetermined holding period Tth1, to stop operating the switching device SW1. The control circuit 7 is configured, after detecting that the input voltage Vi is lower than the second threshold Vth2, to more shorten the maximum ON time Ton-max than that during the normal operation or lengthen the OFF time of the switching device SW1 than the maximum OFF time Toff-max during the normal operation.

In one embodiment, the control circuit 7 is further configured, when stopping operating the switching device SW1, to compare the input voltage Vi measured through the input voltage detection circuit VD1 with the third threshold Vth3. The third threshold Vth3 is higher than the first threshold Vth1 but is lower than the rated voltage of the DC power supply. In this time, the control circuit 7 is configured not to start operating the switching device SW1 until detecting that the input voltage Vi is equal to or higher than the third threshold Vth3.

In one embodiment, the control circuit 7 is configured to more shorten the maximum ON time Ton-max than that during the normal operation after detecting that the input voltage Vi is lower than the second threshold Vth2.

In one embodiment, the control circuit 7 is configured, in the normal operation, to control the switching device SW1 so that the DC-DC converter 2 operates under the Continuous Current Mode (CCM) of turning on the switching device SW1 before the regeneration current stops flowing in a period in which the switching device SW1 is turned off, and to lengthen the OFF time of the switching device SW1 than the maximum OFF time Toff-max during the normal operation after detecting that the input voltage Vi is lower than the second threshold Vth2.

In one embodiment, the control circuit 7 is configured, after detecting that the input voltage Vi is lower than the second threshold Vth2, to more shorten the maximum ON time Ton-max than that during the normal operation by making the threshold (primary current instruction value Ic) of the primary current Ii flowing through the switching device SW1 smaller than that during the normal operation.

In one embodiment, the control circuit 7 is configured, after detecting that the input voltage is lower than the second threshold, to control the switching device SW1 so that the output current of the DC-DC converter becomes 0.

In one embodiment, the control circuit 7 is further configured to compare the input voltage Vi measured through the input voltage detection circuit VD1 with the fourth threshold Vth4 which is higher than the first threshold Vth1 but is lower than the rated voltage of the DC power supply 51. The control circuit 7 is configured to stop operating the switching device SW1 when detecting that a duration time in which the input voltage Vi is kept lower than the fourth threshold Vth4 reaches the predetermined second holding period Tth2 which is longer than the holding period (first holding period) Tth1.

In one embodiment, the control circuit 7 further includes the ON time limiter 35 configured to determine the maximum ON time Ton-max based on the average E(Vi) of the input voltage Vi from the DC power supply 51.

The headlight device 6 of the embodiment includes the power supply 1 and the light source 4 configured to be lit by the output power of the power supply 1.

The vehicle 5 of the embodiment includes the headlight device 6 and the vehicle body 50 on which the headlight device 6 is mounted.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A power supply comprising:
a DC-DC converter, comprising a switching device, an inductor in which energy is accumulated by an electric power from an external DC power supply when the switching device is turned on, and a capacitor configured to be charged by a regeneration current from the inductor when the switching device is turned off; and
a control circuit configured to control switching operation of the switching device, wherein
the control circuit is configured, in a normal operation,
to turn off the switching device when a primary current flowing through the switching device reaches a primary current instruction value or when an ON-time of the switching device reaches an ON-time threshold, and
to turn on the switching device when a predetermined delay time elapses from a time when the regeneration current stops or when an OFF-time of the switching device reaches an OFF-time threshold,
the control circuit comprises an input voltage detection circuit configured to measure an input voltage from the DC power supply to the DC-DC converter, and
the control circuit is configured:
to compare the input voltage measured through the input voltage detection circuit with a first threshold which is lower than a rated voltage of the DC power supply and with a second threshold which is lower than the first threshold;
when detecting that a duration time in which the input voltage is kept lower than the first threshold reaches a predetermined holding period, to stop operating the switching device; and
after detecting that the input voltage is lower than the second threshold, to employ a different ON-time threshold which is shorter than the ON-time threshold defined for the normal operation and to turn on the switching device when the delay time elapses from a time when the regeneration current stops or when the OFF-time of the switching device reaches the different OFF-time threshold.

2. The power supply according to claim 1, wherein the control circuit is further configured, when stopping operating the switching device:
to compare the input voltage measured through the input voltage detection circuit with a third threshold which is higher than the first threshold but is lower than the rated voltage of the DC power supply; and
not to start operating the switching device until detecting that the input voltage is equal to or higher than the third threshold.

3. The power supply according to claim 1, wherein the control circuit is configured, after detecting that the input voltage is lower than the second threshold, to control the switching device so that an output current of the DC-DC converter becomes zero.

4. The power supply according to claim 1, wherein the control circuit is further configured:
to compare the input voltage measured through the input voltage detection circuit with a fourth threshold which is higher than the first threshold but is lower than the rated voltage of the DC power supply; and to stop operating the switching device when detecting that a duration time in which the input voltage is kept lower than the fourth threshold reaches a predetermined second holding period which is longer than the holding period.

5. The power supply according to claim 1, wherein the control circuit further comprises an ON time limiter configured to determine the ON-time threshold based on an average of the input voltage from the DC power supply.

6. A headlight device comprising:
the power supply according to claim 1; and
a light source configured to be lit by an output power of the power supply.

7. A vehicle comprising:
the headlight device according to claim 6; and
a vehicle body on which the headlight device is mounted.

8. The power supply according to claim 1, wherein the delay time is set to be zero or more.

9. A power supply comprising:
a DC-DC converter, comprising a switching device, an inductor in which energy is accumulated by an electric power from an external DC power supply when the switching device is turned on, and a capacitor configured to be charged by a regeneration current from the inductor when the switching device is turned off; and
a control circuit configured to control switching operation of the switching device, wherein
the control circuit is configured, in a normal operation,
to turn off the switching device when a primary current flowing through the switching device reaches a primary current instruction value or when an ON-time of the switching device reaches an ON-time threshold, and
to turn on the switching device when the regeneration current stops,
the control circuit comprises an input voltage detection circuit configured to measure an input voltage from the DC power supply to the DC-DC converter, and
the control circuit is configured:
to compare the input voltage measured through the input voltage detection circuit with a first threshold which is lower than a rated voltage of the DC power supply and with a second threshold which is lower than the first threshold;
when detecting that a duration time in which the input voltage is kept lower than the first threshold reaches a predetermined holding period, to stop operating the switching device; and
after detecting that the input voltage is lower than the second threshold, to employ a predetermined delay time which is larger than zero and to turn on the switching device when the delay time elapses from a time when the regeneration current stops.

10. The power supply according to claim 9, wherein the control circuit is further configured, when stopping operating the switching device:
to compare the input voltage measured through the input voltage detection circuit with a third threshold which is higher than the first threshold but is lower than the rated voltage of the DC power supply; and
not to start operating the switching device until detecting that the input voltage is equal to or higher than the third threshold.

11. The power supply according to claim 9, wherein the control circuit is configured, after detecting that the input voltage is lower than the second threshold, to control the switching device so that an output current of the DC-DC converter becomes zero.

12. The power supply according to claim 9, wherein the control circuit is further configured:
to compare the input voltage measured through the input voltage detection circuit with a fourth threshold which is higher than the first threshold but is lower than the rated voltage of the DC power supply; and
to stop operating the switching device when detecting that a duration time in which the input voltage is kept lower than the fourth threshold reaches a predetermined second holding period which is longer than the holding period.

13. The power supply according to claim 9, wherein the control circuit further comprises an ON time limiter configured to determine the ON-time threshold based on an average of the input voltage from the DC power supply.

14. A power supply comprising:
a DC-DC converter, comprising a switching device, an inductor in which energy is accumulated by an electric power from an external DC power supply when the switching device is turned on, and a capacitor configured to be charged by a regeneration current from the inductor when the switching device is turned off; and
a control circuit configured to control switching operation of the switching device, wherein
the control circuit is configured, in a normal operation,
to turn off the switching device when a primary current flowing through the switching device reaches a primary current instruction value or when an ON-time of the switching device reaches an ON-time threshold, and
to turn on the switching device when a delay time elapses from a time when the regeneration current stops or when an OFF-time of the switching device reaches an OFF-time threshold,
the control circuit comprises an input voltage detection circuit configured to measure an input voltage from the DC power supply to the DC-DC converter, and
the control circuit is configured:
to compare the input voltage measured through the input voltage detection circuit with a first threshold which is lower than a rated voltage of the DC power supply and with a second threshold which is lower than the first threshold;
when detecting that a duration time in which the input voltage is kept lower than the first threshold reaches a predetermined holding period, to stop operating the switching device; and
after detecting that the input voltage is lower than the second threshold, to employ a different primary current instruction value which is smaller than the primary current instruction value defined for the normal operation and to turn off the switching device when the primary current reaches the different primary current instruction value or when the ON-time of the switching device reaches the ON-time threshold.

15. The power supply according to claim 14, wherein the control circuit is further configured, when stopping operating the switching device:
to compare the input voltage measured through the input voltage detection circuit with a third threshold which is higher than the first threshold but is lower than the rated voltage of the DC power supply; and not to start operating the switching device until detecting that the input voltage is equal to or higher than the third threshold.

16. The power supply according to claim 14, wherein
the control circuit is configured to determine a current instruction value as a target value of an output current of the DC-DC converter, and to calculate the primary current instruction value based on the current instruction value, and
the control circuit is configured, after detecting that the input voltage is lower than the second threshold, to employ a different current instruction value which is smaller than the current instruction value defined for the normal operation.

17. The power supply according to claim 14, wherein the control circuit is configured, after detecting that the input voltage is lower than the second threshold, to control the switching device so that an output current of the DC-DC converter becomes zero.

18. The power supply according to claim 14, wherein the control circuit is further configured:
to compare the input voltage measured through the input voltage detection circuit with a fourth threshold which is higher than the first threshold but is lower than the rated voltage of the DC power supply; and
to stop operating the switching device when detecting that a duration time in which the input voltage is kept lower than the fourth threshold reaches a predetermined second holding period which is longer than the holding period.

19. The power supply according to claim 14, wherein
the control circuit further comprises an ON time limiter configured to determine the ON-time threshold based on an average of the input voltage from the DC power supply.

20. The power supply according to claim 14, wherein the delay time is set to be zero or more.

* * * * *